United States Patent [19]

Desrosier

[11] 3,952,111

[45] Apr. 20, 1976

[54] MEAT EXTENDER AND PROCESS OF MAKING THE SAME

[76] Inventor: Norman W. Desrosier, 400 Sandwich St., Plymouth, Mass. 02360

[22] Filed: July 15, 1974

[21] Appl. No.: 488,555

[52] U.S. Cl............................... 426/302; 426/311; 426/331; 426/622; 426/625; 426/656; 426/462; 426/508; 426/802
[51] Int. Cl.² ............................................ A23J 3/00
[58] Field of Search ............ 426/72, 148, 208, 311, 426/364, 370, 371, 375, 443, 462, 463, 532, 331, 618, 650, 656, 438, 508, 802, 302, 622, 625

[56] References Cited
UNITED STATES PATENTS 2,801,176   7/1957   Ozai-Durrani...................... 426/148
3,482,998   12/1969  Carroll et al........................ 426/371

Primary Examiner—A. Louis Monacell
Assistant Examiner—R. A. Yoncoskie
Attorney, Agent, or Firm—Robert A. Maikis

[57] ABSTRACT

A meat extender is derived from wheat kernels and is added to meats such as beef, pork, lamb, fowl and fish to increase the supply thereof. The kernels are boiled and dried to a moisture content of about 20%. The dried kernels are subjected to kneading and grinding operations which develop the gluten structure and cause the material to have a meat-like texture. The material is then dried to about a sixteen per cent moisture content and suitable meat flavors and nutritional supplements are added to produce a food product which closely resembles ground meat in appearance, taste, texture and nutritional value.

24 Claims, No Drawings

MEAT EXTENDER AND PROCESS OF MAKING THE SAME

BACKGROUND OF THE INVENTION

1. Field of the Invention

This invention relates generally to food products and more particularly to a meat extender which may be added to ground natural meat to increase the quantity thereof or which may be consumed alone, and to a process for manufacturing said meat extender.

2. Description of the Prior Art

With the world population rising at an ever increasing rate, it is becoming increasingly difficult to produce a sufficient quantity of high quality animal protein foods for human nutrition. Animal protein foods, such as beef, lamb, pork, poultry, fish and milk, for example, are required for human nutrition because the amino acid components of the animal protein in these foods are directly utilized for growth and maintenance of the human body. The grains and other plant materials which are fed to slaughter and domestic animals are converted by the animals digestive and synthesizing processes into animal protein. Although attempts are being made to increase the supply of high quality animal protein foods by raising more slaughter and domestic animals, it is highly unlikely that the required quantity of animal protein foods will be obtained from these sources because of the economic problems involved in raising and feeding these animals. Similarly, attempts to increase fish production are being frustrated by a general increase in marine pollution throughout the world.

One approach to the problem posed by the shortage of high quality animal protein sources has led to scientific research relating to the conversion of plant tissues into animal tissue equivalent nutrient sources. These converted plant tissue materials are nutritionally modified by adding missing nutrients and balancing other nutrients present to provide a food which is suitable for human needs. Meat extenders, for example, have been developed for the purpose of adding them to ground meats to increase the quantity of the meats without substantially modifying the appearance, taste, texture and nutritional values of the meat. A suitable meat extender for this purpose should be capable of being added to ground meat at levels of up to 50 per cent or more by volume without substantially altering the aforementioned characteristics of the natural product. The principal plant tissue employed for prior art research has been derived from soy beans. The soy beans have been modified by various processes to spin and extrude the soy protein into meat-like products. Unfortunately, at the present time, commercially-available soy bean meat extenders have a strong ""bean"" flavor, an undesirable flatus producing component and amino acid imbalances which are expensive and difficult to correct.

A suitable meat extender should be derived from a relatively inexpensive and plentiful plant tissue source by means of an easily practiced process. The meat extender should also be capable of being mixed with a wide variety of meats. Accordingly, the term ""meats"" as used herein shall be deemed to include beef, pork, lamb, poultry, organ meats, fish and other animal tissues suitable for human consumption. The meat extender should also be capable of being modified to resemble the individual appearance, taste, texture and nutritional value of each of the aforementioned meats. Finally, a suitable meat extender should be sufficiently palatable to render it fit for human consumption without mixing it with any meat protein sources.

SUMMARY OF THE INVENTION

It is an object of this invention to provide a meat extender and process of making the same which utilizes wheat kernels as the basic raw material.

It is further object of this invention to provide a process for modifying the characteristics of wheat kernels to produce a meat extender which resembles various kinds of ground meat in appearance, taste, texture and nutritional value.

It is a still further object of this invention to provide a process for producing a wheat-based meat extender in which the nature of the protein in the wheat is modified to cause that protein to become complementary to the protein in natural meats, so that the wheat may be used to replace a substantial portion of the animal protein required in human diets.

It is another object of this invention to provide a wheat-based meat extender and a process for producing the same which is both economical and easily practiced.

It is an additional object of this invention to provide a process for making a wheat-based meat extender which is suitable for use with a wide variety of natural meats.

It is another object of this invention to provide a process for making a wheat-based meat extender which is easily packaged and stored for extended periods of time.

Briefly, the process of the invention comprises the steps of moisture-cooking wheat kernels to inactivate the enzymes therein and cause the kernels to become chewy and lose their raw taste; drying the cooked kernels to a moisture content of about 20 to 30%; kneading the dried material to develop the gluten structure; grinding the kneaded material to a meat-like texture; and drying the ground material to a moisture content of about 12 to 18%. The basic process produces a meat extender product which may be eaten by itself or mixed with a natural meat to increase the quantity thereof. When the meat extender of the invention is mixed with a natural meat, a meat flavor substance corresponding to the flavor of the natural meat may be mixed with the dried, ground material to provide a suitable taste. Different varieties and types of wheat may be utilized in the process to produce meat extenders which are suitable for use with all types of natural meats. Accordingly, the term ""wheat kernels"" shall be deemed to include both whole and flaked kernels of wheat of any variety either with or without the bran. The term ""moisture-cooking"" as used herein shall be deemed to include boiling or cooking in hot water and steaming. If desired, protein supplements may be added to the processed wheat kernels at various stages of the process to make a meat extender having nutritional values which are comparable to the values of the natural meat with which the meat extender is mixed.

The nature of the invention and other objects and additional advantages thereof will be more readily understood by those skilled in the art after consideration of the following detailed description."

DESCRIPTION OF THE PREFERRED EMBODIMENT OF THE INVENTION

The raw material for the process of the invention is wheat kernels which are generally available in abundant quantities both in this country and in other wheat growing areas of the world. Wheat is considerably less expensive than soy beans and because of its use in a wide variety of products, a sizable network of storage, transportation and processing operations is available. As hereinafter explained, the variety and condition of the wheat kernels employed in the process of the invention will depend upon the type of "meat" with which the meat extender is intended to be mixed. In the following description, it will be assumed that the process is employed to make a meat extender which is to be mixed with ground beef or "hamburger".

Whole hard kernels of red winter wheat are cleaned, tempered and flaked by conventional means, such as corrugated rolls, for example, to fragment the bran on the surface of the kernels. The flaked grain produced is in the form of ovals having a size of approximately 8 millimeters by 5 millimeters and a thickness of about 1 millimeter. The kernels of red winter wheat have about a 14% protein content. The presence of the fragmented bran on the flaked grains of wheat imparts a distinctive "beef" color to the finished product and to some extent controls the length of the gluten structure of the finished product as will be more fully explained hereinafter.

The flaked kernels are then boiled for about 10 minutes in a 2% by volume solution of common salt and water. The boiling of the flaked kernels of wheat causes the raw grain taste to disappear and the kernels become physically pliable or "chewy". The presence of the fragmented bran from the kernels causes the flesh of the kernels to assume a dark golden brown color. Although it is possible to boil the flaked kernels in plain water rather than a salt solution, the presence of the salt gives the finished product the slightly salty or "meaty" taste usually associated with beef products. A salt content of about 1 to 3% in the finished product also helps to prevent putrefaction and to inhibit the growth of pathogenic organisms. The salt content of the finished product also increases the amount of soluble solids to permit the meat extender to remain pliable or chewy over long periods of time. Finaly, the presence of salt in the boiling solution prevents over-stickiness of gelatinized starch and denaturing gluten. Table I illustrates the change in raw taste, texture, wheat taste and color of the flaked kernels as a function of cooking time during the boiling step.

TABLE I

|  | COOKING TIME IN MINUTES AT 212°F | | | | | | | | | |
|---|---|---|---|---|---|---|---|---|---|---|
|  | 1 | 2 | 3 | 4 | 5 | 6 | 7 | 8 | 9 | 10 |
| RAW TASTE* | + | + | + | + | + | – | – | – | o | o |
| TEXTURE** | + | + | + | – | – | – | o | o | o | o |
| WHEAT TASTE*** | + | + | + | + | – | – | – | o | o | o |
| COLOR**** | + | + | + | – | – | o | o | o | o | o |

*+ = present; – = slight; o = none
**+ = hard; – = tough; o = chewy
***+ = present; – = slight; o = trace
****+ = yellow-white; – = light brown; o = dark golden brown As seen in Table I, the raw taste disappears and only a trace of the wheat taste present in the uncooked kernels remains at the conclusion of the boiling step. The texture of the kernels changes from hard to tough and thence to pliable or chewy at the conclusion of the step. The color of the kernels changes from yellow-white to a dark golden brown.

Table II shows the change in cohesiveness or "stickiness" of the flaked kernels as a function of cooking time during the boiling step.

TABLE II

| COOKING TIME IN MINUTES AT 212°F | DESCRIPTION OF TEXTURE | | |
|---|---|---|---|
|  | CRUMBLY | STICKY | GUMMY |
| 0 | x | | |
| 2 | x | | |
| 4 | | x | |
| 6 | | x | |
| 8 | | | x |
| 10 | | | x |

It may be seen in Table II that boiling causes the texture of the flaked wheat to change from crumbly to sticky because of the gelatinization of the starch and the denaturing of the gluten structure. As mentioned previously, the presence of salt retards to some extent the development of the sticky texture.

The boiling or moisture-cooking step also serves to inactivate the enzymes in the flaked wheat kernels. Although boiling is the fastest method of moisture-cooking, it is also possible to cook the kernels in hot water below the boiling point or to steam them for longer periods of time. Regardless of the method of moisture-cooking used, however, it is necessary to carry out the step for a sufficient time period to inactivate the enzymes and cause the kernels to become chewy and lose their raw taste.

The moisture-cooked wheat kernels are then dried until their moisture content drops to about 20%. This may be accomplished by drying them in a stream of hot air at about 350°F for a period of 10 minutes or by any other suitable process, such as tray drying, for example. Table III shows the change in cohesiveness or "stickiness" of the kernels during the drying period when a stream of hot air is employed at a temperature of 350°F.

TABLE III

| DRYING TIME IN MINUTES AT 350°F | DESCRIPTION OF TEXTURE | |
|---|---|---|
|  | GUMMY | CHEWY |
| 0 | x | |
| 2 | x | |
| 4 | x | |
| 6 | x | |
| 8 | | x |
| 10 | | x |

As seen in Table III, the drying step causes the kernels to become chewy rather than gummy because of the gelatinization of starch and partial denaturation of the gluten moiety of the kernels. The kernels at this time have lost all of their wheat flavor in the escaping moisture vapor and develop a bland, slightly salty taste. When external heat is employed in the drying step care must be taken to avoid toasting the kernels. It should also be pointed out here that salt should be added to the kernels in this step if the kernels are cooked in plain water rather than a salt solution.

The next two steps are kneading and grinding. The kneading action developes the gluten structure in the matrix. The longer the kneading takes place, the more developed the gluten structure becomes. However, if excessive kneading is employed, for example, thirty minutes, the gluten structure is eventually destroyed. The grinding step which follows the kneading step causes a further fragmentation of the fragmented bran on the surface of the wheat flakes which is then distributed throughout the product. The grinding step should cause the material to have the "meat-like" texture of ground meat. Double kneading and grinding steps are preferred to single kneading and grinding steps because single kneading and grinding steps produce a ground matrix which has a rough surface texture and appearance. When double steps are employed, the first kneading and grinding steps take a total time of about one minute. The ground material is then allowed to stand for about one-half minute and is then subjected to a second kneading followed by a second grinding. The total time for the second kneading and grinding steps is also about one minute. The double kneading and grinding steps when suitably spaced apart produce a product which closely resembles ground raw beef but which is slightly sticky. It may be noted that both kneading and grinding may take place in a single, mechanical operation when a screw-feed type of meat grinder is employed, since the kneading action takes place in the feeding screw mechanism of the meat grinder. The grinder is preferably set for "fine grind".

The double ground matrix is then subjected to a drying action until the moisture content is lowered to approximately 16%. This may be accomplished by subjecting the ground matrix to a stream of hot air at 350°F for about 5 to 10 minutes or by alternative methods, such as tray drying, for example. Again, care must be taken to avoid toasting the ground material. The drying action causes the ground matrix to lose its excessive stickiness and the material then feels dry to the touch and may be easily broken down into "chunks" of various sizes. The chunks now resemble cooked ground beef in color, i.e., dark golden brown, and have the texture and overall appearance of cooked "hamburger" but do not possess the required flavor.

At this point in the process, the meat extender is palatable and fit for human consumption, either by itself or when mixed with a natural meat. In order to increase palatability, however, the mixture is then chopped and beef flavor substance is added. Preferably, the chopped material is mixed with either natural or imitation dried beef broth. The dried beef broth, in a mixture of about 1% by volume, is added to the chopped product and thoroughly mixed. Since dried beef broth is generally hydroscopic, it reacts with the moisture in the chopped matrix and clings to the wheat particles. Accordingly, the dried broth must be thoroughly mixed to diffuse the beef flavor throughout the matrix. One method of accomplishing this is to allow the mixture to stand for about 10 to 20 minutes and then subjecting the mixture to another grinding operation. Alternatively, the flavor may be diffused throughout the mixture by allowing the mixture to stand in a sealed container over a period of time. If desired, the beef broth in liquid form may be added to the chopped matrix material and then dried. The dried beef broth method is preferred, however, since it eliminates the additional drying step required.

Regardless of which method of adding the beef flavor is employed, the final moisture content of the flavored chopped matrix material is preferably about 16%. The beef flavor substance should be carefully chosen, however, because salt is commonly used as a carrier for commercially-available beef flavors. If oversalting of the mixture occurs, the mixture must be freshened in the same manner as pickled meats and vegetables to produce a palatable product. The higher level of salting, however, does not materially affect the basic process. Although the beef flavor can be added to the chopped mixture either before or after the double kneading and grinding steps, care must be taken to prevent the loss of the volatile components of the beef flavor substance during the drying process.

The foregoing describes the basic process for making a beef-flavored meat extender in accordance with the invention. The flaked, hard red winter wheat kernels employed as the basic raw material for the process produces a formulation which has the appearance, taste and texture of cooked ground beef and may be added to raw ground beef prior to cooking to extend the quantity of that meat for human consumption. If the meat extender is wet with additional water, it strongly resembles raw ground beef. The flaked, red winter wheat kernels may be replaced by whole or unflaked red winter wheat kernels, if desired, since the use of whole kernels merely lengthens the cooking time required as the first step in the process. The red winter wheat kernels with the bran thereon provides a meat extender having a color which is compatible with the darker colored natural meats such as beef, duck, goose and the organ meats of kidney, liver and heart.

By changing the variety or type of the wheat kernels employed as the starting material, it is possible to produce a meat extender which is compatible with other meats, such as pork, poultry and fish, for example, which have a much lighter color and a somewhat different texture than beef. When the bran is removed from the surface of the raw wheat kernels by peeling or pearling, the basic nature of the finished product is changed. The presence of the bran in the matrix during processing produces a chopping action in the gluten structure during the kneading and grinding steps which causes the finished product to have a somewhat shorter gluten structure. The presence of the bran during the process also produces a finished product having the darker appearance which is suitable for meat extenders for beef products and the like. If the bran is removed from the wheat kernels, the matrix which is produced after the kneading and grinding operations is more continuous in nature and more chewy and rubbery because of the lengthened gluten structure. Additionally, the matrix has a whitish-tan color which is more suitable for making a meat extender for chicken, pork, and fish meats which are not a characteristic brown color when cooked. It may also be noted that white wheat kernels may be employed instead of hard red winter wheat to produce lighter-color bases for the lighter-colored natural meats. Since pork, chicken, bacon, ham, sausage, fish and other meat flavors are commercially available, they may be mixed with the lighter-colored meat extender base to produce a wide range of meat extender products which are suitable for mixing with virtually every variety of natural meat.

The basic meat extender product produced by the aforementioned process may, if desired, be fried in a hot edible oil, such as vegetable oil, for example, at a temperature of about 350°F for about 10 seconds. The frying action, although not necessary for the basic process, coats the surface of the particles in the extender product and slows the rehydration of the particles when subjected to the moisture present in raw meats. In this regard, it may be noted that the moisture content of the ground material at the end of the second drying step may be varied from about 12% to 18% to provide a meat extender suitable for mixing with natural meats, having a range of moisture contents. The moisture content of about 16% is, of course, preferred for beef. Similarly, the moisture content of the material at the end of the first drying step may be about 20% to 30%, although 20% is preferred for beef. The oil-fried meat extender when subjected to an additional grinding step develops a fine rubbery texture and appearance which is useful in making some types of meat extender products. The meat extender may, if desired, be treated with an edible oil prior to the kneading-grinding steps to add additional calories to the product and to produce alternative chewy textures.

Although the meat extender produced by the basic process is ready for immediate use, it is often desirable to provide a preservative for long-time storage and packaging. To this end, the meat extender product may be sealed in a container and then heated to about 190°F and cooled or the meat extender product may be heated to approximately 190°F before being placed in the container which is then sealed and cooled. Alternatively, 0.1% sorbic acid or other suitable anti-mycotic agent may be added to the matrix during preparation to control yeasts, molds and some bacteria. This will permit the packaging and sealing of the meat extender product to take place at normal room temperatures. It has also been found that lowering the moisture content of the finished product to about 12 to 14% aids in the preservation of the product. Other methods of preservation are discussed in *Technology of Food Preservation* by N. W. Desrosier, Avi Publishing Company, Westport, Connecticut, Fourth Edition, 1973.

Table IV is a proximate analysis of the relative compositions of natural beef, hard wheat and a hamburger analog. Table V illustrates the relative protein quality of a beef-flavored meat extender product with other sources of protein including natural beef and a 50% by volume mixture of natural beef and the meat extender product of the invention.

TABLE IV

| BEEF | | ANALOG | HARD WHEAT |
|---|---|---|---|
| 60% | H₂O: | 16% | 14% |
| 18% | PROT: | 20% | 14% |
| 20% | FAT: | 1% | 1% |
| 1% | ASH: | 4% | 1% |
| 1% | CHO:(+ Fiber) | 59% | 70% |
| Trace | VIT-MIN: (Optional) | ½RDA | Trace |
| None (Perishable) | PRESERVATIVE | Trace | Dryness |
| 3+ | P.E.R. | 2.4 | 0.9 |

TABLE V

| | FAO | BEEF* MATE | SOY | BEEF | EGG | PORK | MILK HUMAN | 50—50** B—M | COW MILK |
|---|---|---|---|---|---|---|---|---|---|
| | | | AA GRAMS/100 GRAMS PROTEIN | | | | | | |
| TRYPTOPHAN | 1.4 | 1.0 | 1.3 | 1.2 | 1.6 | 1.3 | 1.6 | 1.1 | 1.4 |
| THREONINE | 2.8 | 3.2 | 3.7 | 4.4 | 5.1 | 4.6 | 4.6 | 4.2 | 4.6 |
| ISO-LEUCINE | 4.2 | 3.5 | 4.7 | 5.2 | 6.6 | 5.1 | 6.4 | 4.6 | 6.4 |
| LEUCINE | 4.8 | 7.5 | 7.9 | 8.8 | 8.8 | 7.4 | 8.8 | 7.9 | 9.9 |
| LYSINE | 4.2 | 2.8 | 5.9 | 8.7 | 6.4 | 8.2 | 6.3 | 5.6 | 7.8 |
| METHIONINE | 2.2 | 2.0 | 1.1 | 2.5 | 3.1 | 2.5 | 2.2 | 2.4 | 2.4 |
| CYSTEIN | 2.0 | 3.1 | 1.0 | 1.3 | 2.4 | 1.2 | 2.1 | 1.9 | 0.9 |
| PHENYANALINE | 2.8 | 4.8 | 5.9 | 4.1 | 5.8 | 3.9 | 4.6 | 4.5 | 4.9 |
| VALINE | 4.2 | 4.5 | 5.6 | 5.6 | 7.3 | 5.2 | 6.6 | 5.1 | 6.9 |
| P.E.R. | 2.8 | 2.4 | 2.0 | 3.8 | 3.8 | 3.8 | 4.0 | 3.0+ | 3.1 |

*Hard Red Wheat containing 0.3% L Lysine and 0.3% DL Threonine added.
**Diluted 50—50 with beef hamburger, by volume.

It may be noted from the foregoing tables that the protein level in the wheat-based meat extender product is about 14% as compared to a protein level in natural beef of about 18%. The protein efficiency ratio (P.E.R.) which is a measure of protein quality is about 0.9 for the meat extender product as compared to 3.0+ for natural beef. Accordingly, the protein level of the meat extender product may be corrected to produce a more nutritionally desirable product. To this end, protein supplements may be added to balance the amino acids in the product. About 6% by weight protein supplements from sources such as dried meat products, dried milk and egg products, dried food grade blood, soy protein, hydrolyzed vegetable protein, yeast and extracts, isolated vegetable protein, fish protein, peanut and cottonseed meal, legume protein and combinations of any of the foregoing materials may be added to the wheat-based matrix during processing. Although the protein supplement matter may be added at a number of different points in the basic process, it is preferable to add this matter during the kneading-grinding steps. The supplemental protein is preferably softened by a slight cooking and/or wetting action to prevent significant alteration of the texture and physical characteristics of the meat extender product. An alternative method of balancing amino acids would be the addition of about 5% by volume of flaked, pre-cooked, partially-dried oats to the flaked wheat during the initial boiling step.

The P.E.R. may be corrected to suitable levels by the addition to the wheat-based meat extender product of lysine and threonine which are essential amino acids. Lysine is a normal component of beef broths and both threonine and lysine are also usually present in the supplemental protein materials described above. When the lysine levels in wheat are increased by about 0.3%, the P.E.R. is increased to above 2.0. The addition of 0.3% threonine raises the P.E.R. to above 2.4. The sufficiency of these modifications is believed apparent when it is realized that the P.E.R. of casein is 2.5. If desired, vitamin and mineral supplements may be added to make the meat extender product even more nutritionally balanced than beef and other meats. These supplements and the technology of adding them to the meat extender product are well known and will not be described in detail herein. It has been found, however, that the addition of vitamin and mineral supplements to the meat extender product should take place at a late stage in the manufacturing process. The addition of protein, vitamin and mineral supplements should, of course, be accomplished without modifying the appearance, taste, and texture of the meat extender product. The supplemental protein may also be added prior to the moisture-cooking step in the basic process or it may be pre-cooked and added to the drained kernels or in a later stage of the process, such as the kneading and grinding steps, for example. The decision as to when to add the supplemental material is largely related to convenience and economy in manufacture.

The meat extender product produced by the process of the invention may be added to any of the various types of natural meats or may be consumed as a food by itself. With the addition of supplemental protein and vitamin and mineral sources, the meat extender product per se provides a palatable, nutritionally-balanced food for both human and animal consumption. The ability to use non-animal fats in the meat extender product is particularly valuable for those human diets where the amount of animal fat intake must be restricted for medical reasons. Since the basic product employs wheat and the process of manufacture is relatively simple and uncomplicated, the product itself may be economically produced to provide a relatively inexpensive addition to both human and animal diets. Furthermore, the meat extender product is easily preserved and stored over relatively long periods of time in comparison with natural meats.

It is believed apparent that many changes could be made in the composition of the meat extender product and in the process of making the same and many seemingly different embodiments of the invention could be made without departing from the scope thereof. Accordingly, it is intended that all matter contained in the above description shall be interpreted as illustrative and not in a limiting sense.

What is claimed is:

1. A process of making a meat extender comprising moisture-cooking wheat kernels until the enzymes therein are inactivated and said kernels become chewy and lose their raw taste;
drying the cooked material to a moisture content of about 20 to 30%;
kneading the dried material until the gluten structure thereof is developed but not destroyed;
grinding the kneaded material to a ground meat texture; and
drying the ground material to a moisture content of about 12 to 18%.

2. The process claimed in claim 1 further comprising mixing the dried, ground material with a meat flavor substance corresponding to the flavor of a natural meat.

3. The process claimed in claim 2 wherein said wheat kernels are flaked wheat kernels to shorten the cooking time.

4. The process claimed in claim 3 wherein said flaked wheat kernels have the bran thereon to produce a meat extender for use with the darker-colored natural meats.

5. The process claimed in claim 3 wherein said flaked wheat kernels have the bran removed to produce a meat extender for use with the lighter-colored natural meats.

6. The process claimed in claim 2 wherein said moisture-cooking step comprises cooking the wheat kernels in a solution of water and common salt having a salinity sufficient to impart a slightly salty taste and a salt content of about 1 to 3% by weight of salt in the finished meat extender.

7. The process claimed in claim 2 further comprising adding protein supplements to increase the protein level and protein efficiency ratio of the meat extender.

8. The process claimed in claim 2 further comprising adding vitamin and mineral supplements to modify the nutritional values of the meat extender.

9. The process claimed in claim 2 further comprising treating the cooked, dried material with an edible oil prior to the kneading step to increase the caloric content of the meat extender and modify the texture thereof.

10. The process of claim 2 further comprising frying the meat-flavored, dried ground material in an edible oil at a frying temperature for a period of time sufficient to coat the surface of the particles in the meat extender to minimize rehydration of the meat extender.

11. The process claimed in claim 10 further comprising grinding the oil-fried material to impart a rubbery texture and appearance to the meat extender.

12. The process claimed in claim 2 further comprising
sealing the meat-flavored, dried ground material in a container; and
heating the sealed container to about 190°F to preserve the meat extender.

13. The process claimed in claim 2 further comprising
heating the meat-flavored, dried ground material to about 190°F; and
sealing the heated material in containers to preserve the meat extender.

14. The process claimed in claim 2 further comprising
adding an anti-mycotic agent to the meat extender to permit packaging at room temperatures.

15. The process claimed in claim 2 wherein said kneading and grinding steps are carried out simultaneously.

16. The process claimed in claim 2 further comprising
second kneading and grinding steps carried out at the end of a time interval following the conclusion of said first-named kneading and grinding steps.

17. A process of making a beef extender comprising
boiling flaked hard red winter wheat kernels with the bran thereon for about 10 minutes in a solution of water and common salt to inactivate the enzymes therein and cause said kernels to become chewy and lose their raw taste, said solution having a salinity sufficient to produce a salt content of about 1 to 3% by weight of salt in the finished beef extender;
drying the boiled material to a moisture content of about 20%.
kneading the dried material for a period of time sufficient to partially develop the gluten structure;
grinding the kneaded material to a rough ground meat texture;
kneading the ground material for a period of time sufficient to develop but not destroy the gluten structure;

grinding the kneaded material to a fine ground beef texture;

drying the ground material to a moisture content of about 16%;

chopping the dried material; and mixing the chopped material with a beef-flavor substance to impart a beef flavor thereto.

18. The process claimed in claim 17 further comprising adding protein supplements containing lysine and threonine to the flaked wheat kernels during said process to increase the protein level and protein efficiency ratio of the beef extender.

19. The process claimed in claim 18 further comprising frying the beef-flavored material in an edible oil at a temperature of about 350°F for about 10 seconds to minimize rehydration of the beef extender; and grinding the oil-fried material to impart a rubbery texture thereto.

20. A meat extender prepared by subjecting wheat kernels to successive steps comprising of moisture-cooking until the enzymes therein are inactivated and the kernels are chewy and without their raw taste, drying to a moisture content of about 20 to 30%, kneading until the gluten structure of the cooked and dried kernels is developed but not destroyed, grinding the kneaded material to a ground meat texture, and drying the ground material to a moisture content of about 12 to 18%.

21. A meat extender as claimed in claim 20 further comprising a meat flavor substance mixed with said processed wheat kernels.

22. A meat extender as claimed in claim 21 further comprising a protein supplement mixed with said processed wheat kernels to increase the protein level and protein efficiency ratio of the meat extender.

23. A meat extender as claimed in claim 22 wherein said wheat kernels are flaked red winter wheat kernels having the bran thereon, said meat flavor substance is a dried beef broth, and said protein supplement contains lysine and threonine.

24. A meat extender as claimed in claim 20 wherein said moisture-cooking of the wheat kernels is performed in a solution of water and common salt having a salinity sufficient to impart a salt content of about 1 to 3% by weight of salt in the finished meat extender.

* * * * *